Dec. 27, 1955  G. S. HUNTER  2,728,155
INDICATING INSTRUMENT
Filed Nov. 10, 1951  2 Sheets-Sheet 1

INVENTOR.
GORDON S. HUNTER
BY
C. R. Miranda
ATTORNEY

Dec. 27, 1955 G. S. HUNTER 2,728,155
INDICATING INSTRUMENT
Filed Nov. 10, 1951 2 Sheets-Sheet 2

INVENTOR.
GORDON S. HUNTER
BY
C. R. Miranda
ATTORNEY

United States Patent Office 2,728,155
Patented Dec. 27, 1955

2,728,155

INDICATING INSTRUMENT

Gordon S. Hunter, Plainville, Conn., assignor to Bendix Aviation Corporation, Teterboro, N. J., a corporation of Delaware Application November 10, 1951, Serial No. 255,830

13 Claims. (Cl. 40—77)

This invention in general relates to indicating instruments and more particularly to the illumination of counter type indicating instruments.

Proper illumination of indicating instruments, which are used in control compartments of mobile craft, becomes exceedingly important where a very low level of illumination must be maintained in the compartment and the operator must control the craft under "night-vision" conditions. In spite of the low general illumination level in the compartment, the instruments must be adequately illuminated so that the craft may be properly handled. This requirement is generally satisfied by some method of internal lighting. It is important in these cases that the amount of light which escapes from the instrument should be held to an absolute minimum, if not eliminated entirely.

There have been several satisfactory methods of illumination for dial-type instruments and these include ring lighting of an acrylic resin dial face; illumination of the indicia being obtained from the interior of the dial by taking advantage of the light piping characteristics of acrylic resins. When, however, the information to be presented is by a counter type instrument, the problem of proper illumination is not readily solved. In this case, the problem involves illuminating large moving parts of cylindrical shape, providing for reasonably even illumination of the several parts, and preventing the escape of stray light into the compartment.

The present invention, therefore, contemplates novel means for illuminating a counter type indicating instrument wherein a plurality of hollow counter drums made from clear "Plexiglas," an acrylic resin, are arranged side by side and have positioned therebetween clear acrylic light transmitting spacer sectors. A source of illumination is provided adjacent each of the end drums and the filaments thereof are positioned between the inner and outer surfaces comprising the rims of the acrylic drums so that light is transmitted into the end counters. The inner surfaces of the end drum rims are conical so that part of the light is reflected onto white painted indicia on the outer surface. The spacer sectors carry the light from the end drums to the intermediate drum to illuminate the indicia thereon.

An object of the present invention, therefore, is to provide novel means for effectively illuminating indicia on counter type indicating instruments.

Another object is to provide novel illumination of a plurality of drums arranged side by side and having means positioned therebetween for transmitting light from directly illuminated end drums to intermediate counter drums.

A further object is to provide a plurality of transparent counter drums arranged side by side, the outer end drums being directly illuminated and having conical inner rim surfaces for directing light rays onto the indicia thereof; the conical surfaces also providing for transmission of light rays to clear sectors interposed between the drums whereby illumination of the indicia of intermediate drums is effected.

Still another object is to provide a plurality of series arranged transparent counter drums which transmit light rays to adjacent clear spacer sectors which in turn direct and transmit the rays to intermediate transparent drums to illuminate indicia thereon.

A still further object is to illuminate the indicia of a movable counter drum removed from a source of illumination by interposing light transmitting means therebetween.

The above and other objects and advantages of the present invention will appear more fully hereinafter from a consideration of the detailed description which follows taken together with the accompanying drawings wherein one embodiment of the invention is illustrated.

In the drawings, wherein like reference characters refer to like parts throughout the several views.

Figure 1:
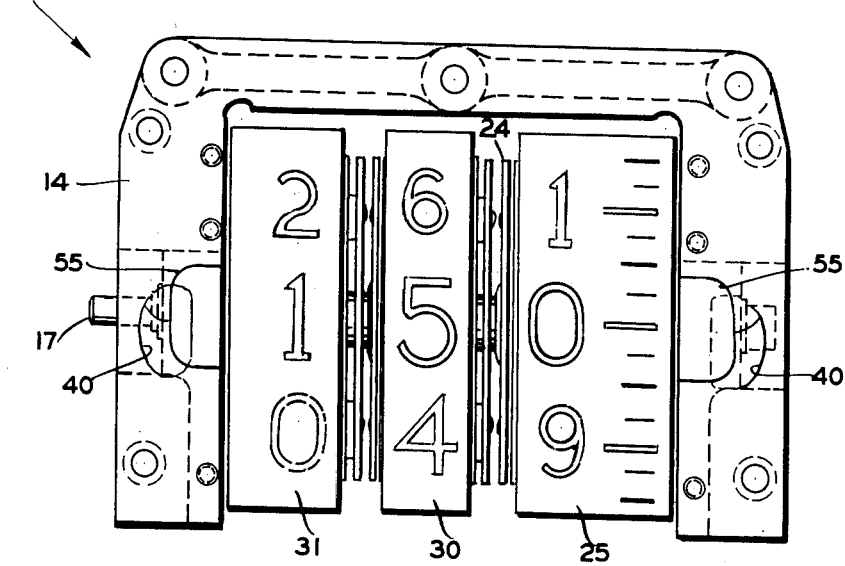
Fig. 1 is a front elevational view of one form of an indicating instrument embodying the present invention.
Figure 2:
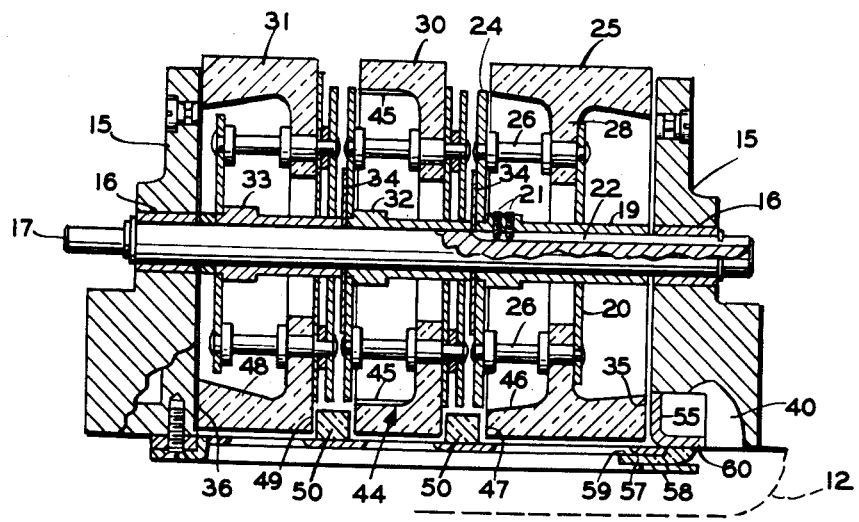
Fig. 2 is a sectional view of the instrument of Fig. 1 and includes a mask together with light transmitting spacer sectors and a pointer secured to the mask.

Referring now more particularly to the drawings for a detailed description of one embodiment of the invention, Fig. 1 illustrates, by way of example, a counter type indicating instrument generally designated by the numeral 11 which is arranged upon an instrument panel 12 (shown in Fig. 3), the latter also mounting a plurality of other indicating instruments (not shown). Indicator 11 comprises an inverted U-shaped mounting bracket frame 14 having a pair of parallel extensions 15 extending at right angles to the front of the frame (Fig. 2). Supported for rotation in two bearings 16 retained in extensions 15 is a rotatable counter shaft 17 which has sleeved over a portion thereof, adjacent the right hand extension (Fig. 2), a bushing 19. Bushing 19 is secured to shaft 17 by a pair of set screws 21 threaded in the bushing and extending into a keyway 22 formed in the shaft. A circular plate 24 is secured about its center to bushing 19 and is secured to a transparent and hollow counter drum 25 by a plurality of pins 26 fixed at one end to plate 24 and at their other ends to a rib section 28 of drum 25 and a circular plate 20 adjacent the rib. It is to be noted that driving means (not shown) are drivably connected to shaft 17 to angularly displace the shaft in response to changes in the condition to be indicated by instrument 11, whereby displacement of the shaft will effect rotation of drum 25 by the construction described above.

A hollow intermediate counter drum 30 and a hollow end drum 31 are supported for rotation relative to shaft 17 by way of bushings 32 and 33, respectively, sleeved on the shaft. The manner of fastening drums 30 and 31 to their respective bushings is substantially the same as that for fastening counter drum 25 to bushing 19, and this is apparent from Fig. 2 of the drawings. Shims 34 are fastened to the left hand sides of counters 25 and 30 so as to project between the bushings and adjacent shaft 17, in order to maintain the counters a predetermined distance apart. Counter drums 30 and 31 do not rotate with shaft 17 since they are not secured thereto and, therefore, angular displacement of the shaft will effect rotation of drum 25 only. Conventional interconnecting means, not forming part of the present invention, are provided between the drums for driving counter drums 30 and 31 in response to the movement of drum 25. Thus, with one revolution of drum 25, a small angular displacement of drum 30 will be effected, while one full revolution of drum 30 will result in displacing drum 31 a small angular distance. Further description of the interconnecting means is not believed necessary, inasmuch as the construction thereof will be apparent to those skilled in the art.

Figure 3:
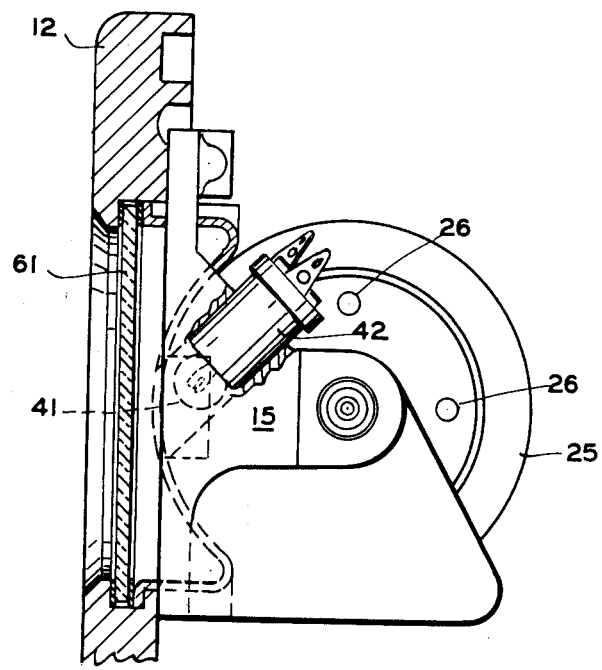
Fig. 3 is a side elevational view of the instrument of Fig. 1 and includes part of the panel upon which the instrument is mounted.

Counter drums 25, 30 and 31 are made of colorless transparent material, such as an acrylic resin, and the rims of drums 25 and 31 are provided with light admitting input edge portions 35 and 36, respectively. Formed in extensions 15 and adjacent the input edge portion of drums 25 and 31 are recesses 40, one of which is shown in Fig. 2, which accommodate lamps 41 retained in lamp sockets 42 (Fig. 3). The rims or walls of the drums have cylindrical outer surfaces which are provided with indicia (Fig. 1) distributed in the usual manner around the drum, such indicia being rendered capable of illumination by any known or other suitable treatment of the counter drums rendering the background substantially opaque and the indicia translucent so as to be illuminated by light distributed through the rims of the drum by internal reflection. Preferably the outer surface of the rims are engraved and then uniformly sprayed with a translucent coating. Afterwards the outer surfaces are coated with black paint or printers' ink applied by rolling in order to avoid coating the engraved indicia. The counter drums are then baked at a low temperature to harden the black coating. The inner surface 44 of intermediate drum 30 is coated with a translucent white paint 45 and is concentrically arranged with respect to the outer surface thereof, while drums 25 and 31 have inner surfaces 46 and 48, respectively, conically arranged with respect to their outer surfaces so as to present rims of variable thicknesses. Inner surface 46 of drum 25 tapers in the direction of drum 30 whereby the light admitting portion 35 is of greater thickness than the opposite edge 47 of the rim, and similarly, inner surface 48 of drum 31 tapers toward the opposite edge 49 and drum 30. The conical surfaces 46 and 48 serve to reflect part of the light rays, entering through light admitting portions 35 and 36, onto the indicia to illuminate them, and also to provide for the concentration of light rays at the opposite edges or light emitting portions 47 and 49 of the drum rims.

Figure 5:
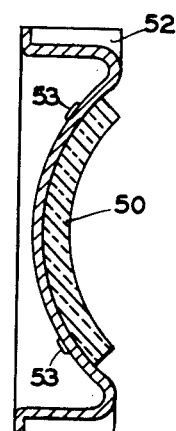
Fig. 5 is a side elevational view, in section, of the mask taken along line 5—5 of Fig. 4.

Interposed between drums 25 and 30, and between drums 31 and 30 are plastic arcuate sectors 50 of transparent colorless acrylic resin, highly polished on all sides, which are secured to a mask or shield 52, as by rivets 53 (Fig. 5). Sectors 50 have a radial thickness substantially equal to the thicknesses of the rims of drums 25, 30 and 31, and serve as light transmitting means for carrying and transmitting light rays from drums 25 and 31 to intermediate drum 30 where translucent coating 45 reflects the rays toward the outer surface to illuminate the indicia thereon. Openings 54 are provided in shield 52 for viewing the indicia on the counter drums and in order to concentrate the light rays from drums 25 and 31 at only that portion of drum 30 viewable through the opening in the shield, sectors 50 extend for only a portion of the peripheries of the rims of the drums. By reason of the foregoing, the indicia on drum 30 will have substantially the same illumination level as the indicia on the end drums, inasmuch as the light rays passing through both of the end drums will enter the intermediate drum.

It will be apparent to those skilled in the art that the present invention also contemplates an arrangement wherein the end counter 31 may be eliminated if design requirements deem it necessary. In such cases, sufficient illumination of counter 30 may be effected by providing a lamp adjacent counter 25 of higher intensity. It has been found to be advantageous to use red light for illuminating the counters and accordingly, an L-shaped red color screen 55 is secured to frame 14 adjacent each lamp 41, whereby light rays transmitted therefrom pass through the screen before reaching the drums.

Figure 4:
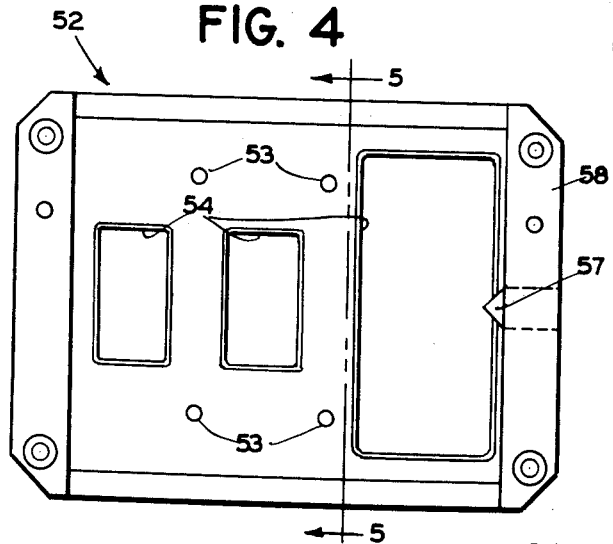
Fig. 4 is a front elevational view of the mask for the instrument.

Cemented to shield 52, and adjacent opening 54 for drum 25, is a pointer 57 of transparent, clear colorless material, preferably a plastic such as acrylic resin having polished surfaces; the pointer being contoured as indicated in Figs. 2 and 4. Pointer 57 is positioned in an opening formed between a shoulder portion 58 of shield 52 and the body of the shield. The dimensions of the pointer are such that it extends past the shoulder so as to overlie opening 54 to be adjacent the indicia on drum 25. The overlying portion of pointer 57 is coated on the side adjacent drum 25, with a translucent paint 59. Light rays from lamp 41, in the right hand extension 15, pass through screen 55 into light-admitting surface 60 of pointer 57, which is located behind shoulder 58 and directly in front of the screen, to illuminate the coated portion 59 of the pointer. Under "black-out" conditions the coated portion of the pointer and the indicia on the counter drums will be visible, the light rays striking the coated portions and being reflected toward an observer. Shield 52 prevents stray light rays around the drums from reaching the eyes of an observer while the portion of panel 12 (shown in broken lines in Fig. 2), adjacent pointer 57 and lamp recess 40, prevents the escape of light therefrom. A transparent cover window 61 (shown in Fig. 3) is provided in panel 12, and is located in front of shield 52 for protecting the indicator and for permitting visual access to the indicia on the counter drums.

From the foregoing, it is apparent that the present invention provides even illumination of large moving parts of cylindrical shape and in addition, the illumination of a transparent and movable counter drum removed from a source of illumination. The utilization of a pair of transparent end counter drums which are shaped to illuminate indicia thereon and also transmit light rays therethrough to illuminate the indicia on an intermediate drum provides novel and simple means for effectively illuminating a counter type indicator. It is readily apparent that the end drums need not be indicia bearing members but may be, within the contemplation of the present invention, moving parts which are required in an indicator between the counter drum to be illuminated and a source of illumination. Thus, by making the moving parts of transparent material illumination of the counter drum may be accomplished. Furthermore, more than one intermediate drum removed from a source of illumination and between two end drums may be illuminated by the arrangement of the present invention without departing from the spirit and scope thereof.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a lighting arrangement for drum-type indicators, a pair of light conducting cylindrical drums, indicia carried by the circumferential surface of one of said drums and adapted to be illuminated by light rays within said one drum, and a source of illumination arranged at a side of the other of said drums and directing light rays into the latter, said drums being arranged to provide for passage of light rays from said other drum into said one drum to thereby illuminate the indicia.

2. In a lighting arrangement for drum-type indicators, a pair of spaced light conducting and cylindrical end drums, a third light conducting cylindrical drum intermediate said end drums, indicia carried by the circumferential surfaces of said drums and adapted to be illuminated by light rays within said drums, and a source of illumination arranged at a side of at least one of said end drums for directing light rays into said one end drum, said drums being arranged to provide for passage of light rays from said one end drum into said intermediate drum and therefrom into the other end drum to illuminate the indicia carried by said drums.

3. In a lighting arrangement of the class described, a pair of members each having an arcuate shaped surface and being made of light conducting material, indicia carried on the arcuate surface of one of said members and adapted to be illuminated by light rays within said one member, and a source of illumination arranged for directing light rays into the other of said pair of members, said members being arranged to provide for passage of light rays from said other member into said one member to thereby illuminate the indicia.

4. In a lighting arrangement of the class described, a pair of coaxial members made of light conducting material and mounted for rotation about a common axis, each of said members having an arcuate shaped surface spaced from said axis, indicia carried by the arcuate surface of one of said members and adapted to be illuminated by light rays within said last-named member, a source of illumination arranged for directing light rays into the other of said pair of members, said members being arranged to provide for passage of light rays from said other member into said one member to thereby illuminate the indicia.

5. In a lighting arrangement of the class described, a pair of spaced and coaxially arranged light conducting members each having an arcuate shaped wall with inner and outer wall surfaces, said members each having a light admitting edge and one of said members having a light emitting edge, said one member having an inner wall surface shaped differently than the inner wall surface of said other member to provide a concentration of light rays at said light emitting edge when light rays are directed into said one member, indicia carried by the wall of the other of said members and adapted to be illuminated by light rays within said last-named member, a source of illumination arranged for directing light rays through the light admitting surface of said one member, and light transmitting means interposed between the light emitting edge of said one member and the light admitting edge of said other member for receiving light rays from said one member and directing the rays into said other member.

6. In a lighting arrangement of the class described, a pair of spaced light conducting members, a light receiving member interposed between said pair of members, each of said members having an arcuate shaped wall, indicia carried by the wall of said intermediate member and adapted to be illuminated by light rays within the last-named member, and a source of illumination for each of said pair of members for directing light rays into the latter, said members being arranged to provide for passage of light rays therethrough and into said intermediate member to thereby illuminate the indicia thereof.

7. In a lighting arrangement of the class described, a pair of spaced light conducting members, a light receiving member interposed between said pair of members, each of said members having an arcuate shaped wall with inner and outer wall surfaces, said pair of members having light admitting edges and light emitting edges and having inner wall surfaces shaped differently than the inner wall surface of said intermediate member to provide a concentration of light rays at the light emitting edges when light is directed into said pair of members, a source of illumination adjacent each light admitting edge for directing light rays therethrough, and light transmitting means arranged between the light emitting edges and the intermediate member for receiving light rays from said last-named edges and for directing the rays into said intermediate member.

8. In a counter type indicating instrument, a pair of spaced light conducting indicating end counters, a light receiving counter intermediate said end counters, a source of illumination for each end counter and directing light rays into the latter, and light transmitting means interposed between the end counters and the intermediate counter for receiving light rays from said end counters and directing the rays into said intermediate counter to illuminate the latter.

9. In a counter type indicating instrument, a pair of spaced indicating end counters each having a light conducting portion, an intermediate counter arranged between said end counters and having a light receiving portion, a source of illumination arranged adjacent each light conducting portion for directing light rays into the latter, and light transmitting members having substantially the same contour as said counters and interposed between said end counters and said intermediate counter for receiving light rays from the light conducting portions and directing the rays into the light receiving portion of said intermediate counter for illuminating the latter.

10. In a counter type indicating instrument, a pair of spaced indicating end counters, a light receiving counter intermediate said end counters, said end counters having light conducting rim portions defined by inner and outer wall surfaces, said inner wall surfaces being inclined and adapted to concentrate light rays at edges of said rim portions adjacent the intermediate counter when light rays enter said rim portions, a source of illumination adjacent each rim portion of the end counters for directing light rays into the latter, and light conducting members arranged between said end counters and the intermediate counter for receiving light rays from the rim portions of said end counters and directing the rays into said intermediate counter to illuminate the latter.

11. In a counter type indicating instrument, a pair of spaced light conducting indicating end counters each having inner and outer wall surfaces, the inner wall surfaces being inclined to provide light admitting divergent portions and light emitting convergent portions, a third counter intermediate said end counters and having a light receiving portion, a source of illumination arranged adjacent each divergent portion of said end counters and directing light rays into the latter, and light conducting members arranged between each end counter and said third counter for receiving light rays from the convergent portions and directing the rays into the light receiving portion of the said third counter for illuminating the latter.

12. In a counter type indicating instrument, a pair of spaced light conducting indicating end drums, a light receiving drum intermediate said end drums, a source of illumination for each end drum for directing light rays into the latter, a shield covering portions of said drums for preventing the escape of light rays and having openings therein for viewing the drums, and light conducting sector members carried by the shield and interposed between the end drums and the intermediate drum for receiving light rays from said end drums and directing the rays into said intermediate drum to illuminate the latter.

13. In combination, a pair of spaced light conducting indicating end counters, a light receiving counter intermediate said end counters, said end counters being provided with enlarged light admitting portions adjacent their outer sides and reduced light emitting portions adjacent their inner sides, a source of illumination for each end drum for directing light rays through said enlarged light admitting edges, and light receiving and transmitting members interposed between said end counters and said intermediate counter for receiving light rays from said reduced light emitting portions and directing the rays into said intermediate counter to illuminate the latter.

References Cited in the file of this patent

UNITED STATES PATENTS

| | | |
|---|---|---|
| 2,249,655 | Hayes | July 15, 1941 |
| 2,290,278 | Failla | July 21, 1942 |
| 2,488,955 | Wood | Nov. 22, 1949 |

FOREIGN PATENTS

| | | |
|---|---|---|
| 892,143 | France | Mar. 29, 1944 |